Patented Mar. 16, 1943

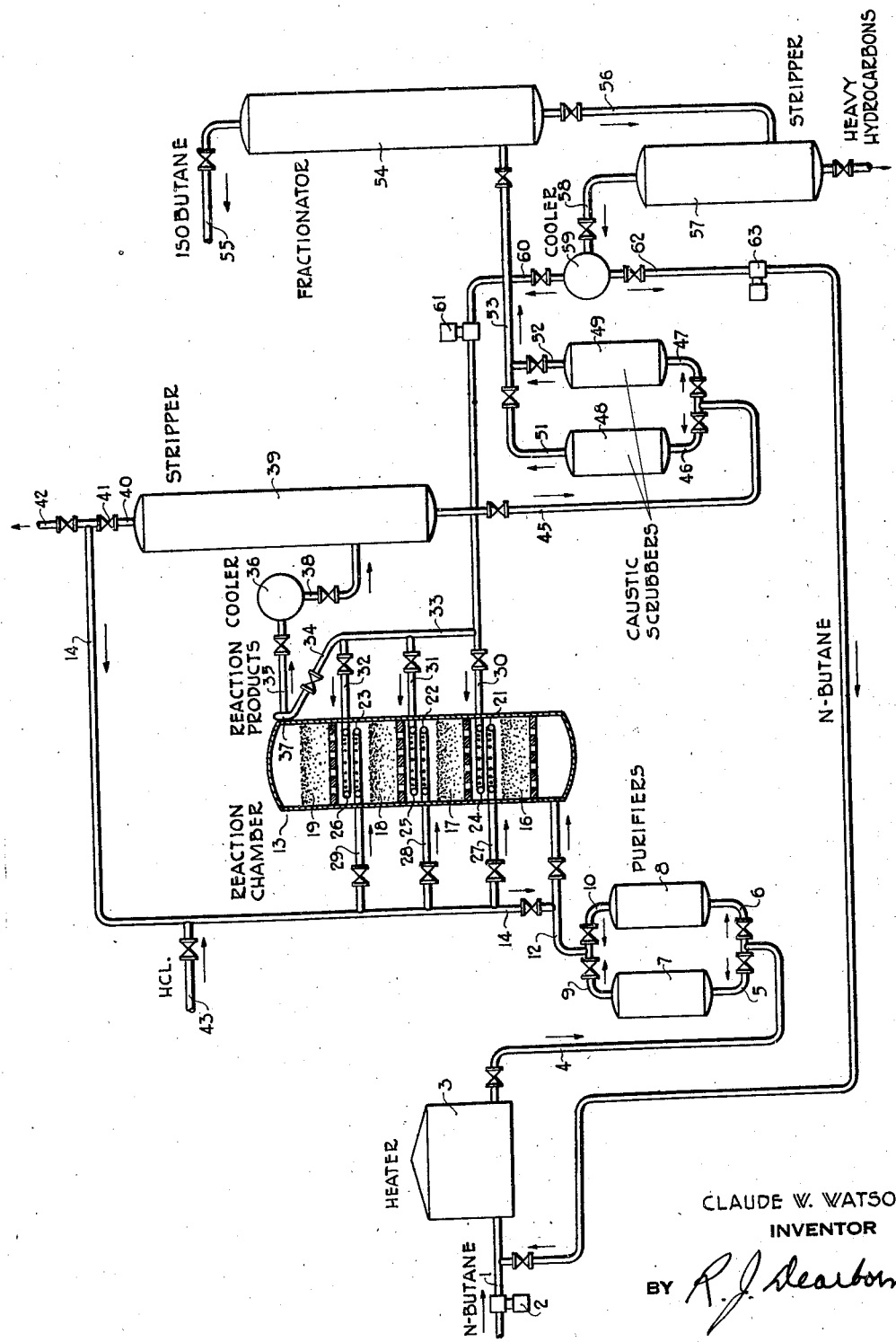

2,314,297

UNITED STATES PATENT OFFICE 2,314,297

PROCESS OF ISOMERIZATION

Claude W. Watson, Tuckahoe, N. Y., assignor, by mesne assignments, to The Texas Company, New York, N. Y., a corporation of Delaware Application March 29, 1941, Serial No. 385,837

11 Claims. (Cl. 260—683.5)

This invention relates to the conversion of hydrocarbons, especially the isomerization of normal paraffins to isoparaffins. More particularly the invention relates to an improved process for the isomerization of normal butane to isobutane.

It has been proposed to carry out the isomerization of normal paraffins in various ways. For example, it has been proposed to pass the feed hydrocarbons in either the liquid phase or the vapor phase in contact with an isomerization catalyst. As isomerization catalysts it has been proposed to use metallic halides, such as aluminum chloride, aluminum bromide, iron chloride and zirconium chloride, together with a halogen-containing promoter for this type of catalyst, such as the hydrogen halides, particularly hydrogen chloride, and alkyl chlorides or other compounds which in the presence of an aluminum halide yield a hydrogen halide. It has also been proposed to use as the catalyst an aluminum halide suspended in an aluminum halide-hydrocarbon complex. Probably the most familiar catalyst of this class is anhydrous aluminum chloride which may be employed in lump form. A valuable catalyst is also one consisting of an adsorbent material, especially alumina, which may be bauxite or activated alumina, impregnated with aluminum chloride, the impregnation preferably being effected by contacting lump alumina with aluminum chloride in the vapor or liquid phase.

The present invention is concerned with improvements in processes of the above general type, which improvements are designed especially to regulate the process and preserve the activity of the catalyst. In the proposed processes the feed hydrocarbons have been mixed with the desired amount of promoter, which amount has varied in accordance with the type of catalyst and reaction chamber employed and other factors, and the resulting mixture has been passed through a reaction chamber containing the catalyst. It has been proposed to employ a catalyst chamber consisting of a single bed of catalyst or a chamber in which a plurality of beds are disposed. In any case, the amount of promoter in contact with the reacting hydrocarbons has been substantially constant throughout the reaction chamber. Thus at the point where the feed hydrocarbons consist predominantly of normal paraffins the promoter concentration is the same as at a later point in the catalyst chamber, where equilibrium conditions are being approached and the proportion of normal paraffins in the reacting hydrocarbons has been reduced.

In accordance with the present invention, instead of introducing all of the promoter being used into the feed hydrocarbons entering the reaction chamber, the promoter is introduced at a plurality of points within the chamber. By proceeding in this way the activity of the catalyst throughout the chamber is controlled and greater activity is obtained where the concentration of normal paraffins in the reacting hydrocarbons is low. Also the apparent rapid deterioration of the catalyst at the inlet end of the reaction chamber is avoided. The present process may be operated with especial facility with the use of a reaction chamber in which the catalyst is contained in a plurality of distinct beds, since this simplifies the injection of the promoter.

The process also preferably involves controlling the temperature during the reaction by injecting cool hydrocarbons, which advantageously are normal paraffins of the type comprising the feed hydrocarbons, into the reacting hydrocarbons during their passage through the reaction chamber. Since the isomerization reaction is exothermic in nature it is advisable to control the temperature and thereby attain the desired degree of conversion in the zones of the reaction chamber.

In general the conditions of operation of the process are not substantially different from the conditions which have been proposed previously. For example, the reaction temperatures may vary from 150° to 250° F. and above, and the contact time may vary from one to fifteen minutes. As an instance of the operation of the process, temperatures varying from 210° to 230° F. and contact times from one to five minutes may be employed.

As to promoter concentration, it will be understood that this will vary according to the catalyst employed and other conditions of operation. In general, where hydrogen chloride is employed as a promoter, it is unnecessary to have the highest promoter concentration above that corresponding to 15 per cent by weight of the feed hydrocarbons and usually this concentration will be considerably less than this amount. When the process is operated using relatively fresh catalyst consisting of activated alumina impregnated with aluminum chloride and the temperature is maintained from about 210° to 230° F., it is usually preferred to maintain the highest promoter concentration at from one to two per cent of the weight of the feed hydrocarbons. By way of example of the operation of the process, the promoter may be proportioned so as to introduce into the feed hydrocarbons before contact with the catalyst about one-half of the total amount of promoter to be used, the remainder of the promoter being introduced at spaced points in the bed or between reaction zones so as to regulate the catalytic action.

The drawing discloses a flow diagram of one manner of carrying out the process of the invention. In order to illustrate the operation more clearly a reaction chamber of the type which may be employed is shown in section. Since the process is especially valuable for the isomerization of normal butane to isobutane, the process will be described in connection with this operation. Also the process will be described in connection with the use of an isomerization catalyst consisting of six to eight mesh lumps of alumina impregnated with 17 to 18 per cent by weight of aluminum chloride, although, as above indicated, other isomerization catalysts may be used.

Referring to the drawing, normal butane is forced into the system through the line 1 by means of the pump 2 and passes first to a heater 3 where it is heated to a temperature in the neighborhood of 210° F. The pressure in the system is regulated so that the butane is vaporized at this temperature. The pressure is preferably maintained not substantially below the highest pressure at which the butane can exit as a vapor at the reaction temperature. From the heater, the butane vapors are passed through line 4 and either of lines 5 and 6 which lead respectively to purifiers 7 and 8. It is desirable to purify the normal butane particularly where this substance contains olefins and moisture. The purifiers, which preferably contain spent catalyst, are alternated in use. The butane vapors leaving the purifiers pass through either of lines 9 and 10 and into line 12 leading into the lower portion of reaction chamber 13. During their passage in line 12 a small proportion of promoter is added through line 14. As shown reaction chamber 13 consists of four catalyst beds, 16, 17, 18 and 19 which are supported on foraminous supports and are disposed so as to leave vapor spaces therebetween. In the vapor spaces between catalyst beds there are disposed injectors 21, 22 and 23 for introducing additional promoter into the vapors passing between the beds and also injectors 24, 25 and 26 for adding cool hydrocarbons to the vapors for controlling the temperature. As shown, these injectors consist of circular pipes provided with perforations so that the materials introduced may be mixed rapidly with the vapors. The promoter passes into the injectors 21, 22 and 23 through line 27, 28 and 29, respectively, which are connected to line 14. The injectors 24, 25 and 26 are connected to lines 30, 31 and 32, respectively, and the latter lines are connected to line 33 through which is passed recycled normal butane, as will presently be described.

The normal butane containing a small proportion of promoter is passed through catalyst bed 16 where partial isomerization is effected and then into the vapor space leading to bed 17. In the vapor space additional promoter is introduced through injector 21, and cool normal butane is introduced through injector 24, when it is desired to provide cooling at this point. As the vapors pass through the remaining beds of the reaction chamber additional injection of promoter and normal butane is effected so that the vapors reaching bed 19, which contain the lowest percentage of normal butane, contain the highest percentage of promoter, and the temperature has been controlled so that the temperature in this bed is in the neighborhood of 230° F. The vaporous reaction products leave the reaction chamber through line 35 which conducts them to cooler 36. During their passage through the reaction chamber, the vapors will have become contaminated with sublimed aluminum chloride and may have become substantially saturated with this salt so that upon even slight cooling, condensation of the salt occurs. At the existing temperature the salt would tend to react with the vapors and cause over-reaction and even coking. Thus, the pipes and other equipment would tend to become clogged not only with the deposited salt but also with products formed by the reaction of the salt with the vapors. To avoid precipitation of this salt in the vapor lines and in the cooler, cool liquid normal butane is preferably intimately mixed with the vapors in an amount sufficient to provide an amount of liquid, including the condensed liquid as well as the normal butane, adapted to dissolve the sublimed aluminum chloride. This is done prior to any cooling of the vapors sufficient to cause condensation. Preferably at the point line 35 joins the reaction chamber, the line is encircled by a pipe 37, which is connected with the interior of line 35 by a series of perforations. The liquid normal butane is introduced into pipe 37 through line 34, and into line 35 where the butane is mixed with the hot vapors. The resulting mixture, after being passed through cooler 36 where the temperature is reduced to about 50° to 60° F. and condensation is completed, passes into line 38 leading into fractionator or stripper 39. The stripper is operated so as to separate the hydrogen chloride and lighter gases which pass into line 40 controlled by valve 41. A portion of these gases is bled off through line 42, and the remainder is recycled through line 14 to the normal butane entering the system through line 12, and through lines 27, 28, and 29. Fresh hydrogen chloride is introduced into the system through line 43.

From the bottom of stripper 39 the liquid products are conducted through lines 45 and 46 or 47 to one of two caustic scrubbers, 48 and 49. In the scrubber, the aluminum chloride and remainder of the hydrogen chloride are removed and the products are passed through line 51 or line 52 and line 53 and into fractionator 54. The products are separated into a fraction consisting largely of isobutane and a fraction comprising normal butane and heavier hydrocarbons. The isobutane is removed from the system through line 55, condensed and passed to storage. The latter fraction is removed from the fractionator through line 56 and into the stripper or fractionator 57 wherein the heavier hydrocarbons, which are normally formed in small amounts in the conversion reaction, are separated and removed from the normal butane. The normal butane is passed through line 58 and into cooler 59, and preferably liquefied. From the cooler a portion of the butane is recycled through line 60, which is provided with a pump 61, and this portion passes into line 33 and is used as described above for cooling the reaction products and preventing condensation of sublimed aluminum chloride. The remainder of the butane is passed into line 62 which is provided with pump 63 and is recycled back to line 1 and is employed as makeup for the process.

It will be understood that the process described is subject to considerable variation within the scope of the invention. Thus it is not essential that the catalyst be disposed in a plurality of beds since it is possible to inject the promoter at selected points in a single bed and achieve the control desired, although such control is facilitated by maintaining distinctly separate beds in the manner described. It is also possible to employ separate chambers containing the catalyst. In any case, the whole body of catalyst is considered as being composed of a plurality of reaction zones in which the conditions are controlled so as to regulate the action of the catalyst. In carrying out the process using fresh catalyst in each of the zones at the start, it is often desirable to increase the highest promoter concentration as the activity of the catalyst decreases in the several zones.

The purifier containing spent catalyst has been described as being a separate vessel. The process may also be carried out with advantage using two reaction chambers, through which the direction of flow may be reversed. With this arrangement, when the catalyst in one chamber has become spent, this chamber is used as the purifier and the feed hydrocarbons will pass first through this chamber and then through the other chamber containing fresh catalyst. Periodically the system would be shut down to replace the spent catalyst ineffective for purification with fresh catalyst, and the flow would then be reversed.

Although it is preferred to use recycled normal paraffin hydrocarbons for controlling the reaction temperature and for preventing condensation of sublimed aluminum chloride, hydrocarbons from other sources may be used. For example, it is contemplated that in certain cases it may be found desirable to employ a part of the feed hydrocarbons for these purposes; in these cases, a portion of these hydrocarbons would preferably be by-passed around the heater.

Features of the present process with respect to temperature control and prevention of salt condensation are broadly disclosed and claimed in my application Serial No. 385,839, filed of even date herewith.

Since changes may be made in the processes described above without departing from the scope of the invention, it is intended that the description shall be interpreted as illustrative and not in a limiting sense.

I claim:

1. In the process of isomerizing normal paraffin hydrocarbons to isoparaffins wherein a stream of said normal paraffin hydrocarbons at conversion temperatures is passed through an isomerization catalyst in the presence of a promoter for said catalyst, the improvement which comprises increasing the concentration of promoter in said stream of normal paraffin hydrocarbons during the passage through said catalyst.

2. In the process of isomerizing normal butane to isobutane wherein said normal butane in vapor phase and at conversion temperatures is brought into contact with a metallic halide isomerization catalyst in the presence of a promoter for said catalyst, the improvement which comprises passing hydrocarbon vapors comprising normal butane through a substantial mass of said catalyst and increasing the amount of promoter in said vapors during the passage through said catalyst, so that the concentration of promoter in the hydrocarbon stream increases as the stream advances through the catalyst mass whereby the vapors containing the lowest percentage of normal butane contain the highest percentage of promoter.

3. In the process of isomerizing normal butane to isobutane wherein said normal butane in vapor phase and at conversion temperatures is brought into contact with an aluminum halide isomerization catalyst in the presence of a hydrogen halide promoter for said catalyst, the improvement which comprises passing a stream of hydrocarbon vapors comprising normal butane through a substantial mass of said aluminum halide catalyst, and increasing the amount of hydrogen halide promoter in said vapors during the passage through said catalyst, so that the concentration of promoter in the hydrocarbon stream increases as the stream advances through the catalyst mass whereby the vapors containing the lowest percentage of normal butane contain the highest percentage of promoter.

4. In the process of isomerizing normal butane to isobutane wherein said normal butane in vapor phase, at conversion temperatures and in the presence of hydrogen chloride is brought into contact with a catalyst consisting of alumina impregnated with aluminum chloride, the improvement which comprises passing a stream of hydrocarbon vapors comprising normal butane through a substantial mass of said catalyst, and increasing the amount of hydrogen chloride in said vapors during the passage through said catalyst, so that the concentration of promoter in the hydrocarbon stream increases as the stream advances through the catalyst mass whereby the vapors containing the lowest percentage of normal butane contain the highest percentage of hydrogen chloride.

5. In the process of isomerizing normal paraffin hydrocarbons to isoparaffins wherein said normal paraffin hydrocarbons in vapor phase and at conversion temperatures are brought into contact with an aluminum halide isomerization catalyst in the presence of a promoter for said catalyst, the improvement which comprises passing hydrocarbon vapors comprising said normal paraffin hydrocarbons through said catalyst contained in a plurality of reaction zones, increasing the amount of promoter in said vapors during the passage through said catalyst, so that the concentration of promoter in the hydrocarbon vapors increases as the vapors advance through the catalyst whereby the vapors containing the lowest percentage of said normal paraffin hydrocarbons contain the highest percentage of promoter, and controlling the temperature in a reaction zone by introducing into the hydrocarbon vapors cool hydrocarbons comprising said normal paraffin hydrocarbons.

6. In the process of isomerizing normal butane to isobutane wherein said normal butane in vapor phase and at conversion temperatures is brought into contact with an aluminum chloride isomerization catalyst in the presence of hydrogen chloride which acts as a promoter for said catalyst, the improvement which comprises passing hydrocarbon vapors comprising normal butane through said catalyst contained in a plurality of reaction zones, increasing the amount of hydrogen chloride in said vapors during the passage through said catalyst, so that the concentration of promoter in the hydrocarbon vapors increases as the vapors advance through the catalyst whereby the vapors containing the lowest percentage of normal butane contain the highest percentage of hydrogen chloride, and controlling the temperature in a reaction zone by introducing into the hydrocarbon vapors cool hydrocarbons comprising normal butane.

7. In the process of isomerizing normal butane to isobutane wherein said normal butane in vapor phase, at conversion temperatures, and in the presence of hydrogen chloride is brought into contact with an isomerization catalyst consisting of alumina impregnated with aluminum chloride, the improvement which comprises passing hydrocarbon vapors comprising normal butane through said catalyst contained in a plurality of reaction zones and discharging the vapors from the final zone, increasing the amount of hydrogen chloride in said vapors during the passage through said catalyst, so that the concentration of promoter in the vapors increases as the vapors advance through the catalyst whereby the vapors containing the lowest percentage of normal butane contain the highest percentages of hydrogen chloride, controlling the temperature in a reaction zone by introducing into the hydrocarbon vapors cool hydrocarbons comprising normal butane, and mixing with the vaporous reaction products containing sublimed aluminum chloride an amount of liquid normal butane sufficient to form a total amount of hydrocarbon liquid adapted to dissolve the sublimed aluminum chloride and thereby prevent precipitation of solid aluminum chloride at the point of discharge from said final zone.

8. In the process of isomerizing hydrocarbons to convert them into more highly branched chain hydrocarbons wherein a stream of feed hydrocarbon at conversion temperatures is passed through a reaction zone containing an isomerization catalyst in the presence of a promoter for said catalyst, the improvement which comprises maintaining a relatively small concentration of promoter in the hydrocarbon stream during initial contact between the feed hydrocarbon and the catalyst, and increasing the concentration of promoter in the hydrocarbon stream as it advances through the reaction zone.

9. The method according to claim 8 in which the isomerization catalyst comprises aluminum halide and the promoter comprises hydrogen halide.

10. In the process of isomerizing hydrocarbons by contact with an isomerization catalyst in the presence of a promoter for the catalyst, the steps which comprise passing a stream of hydrocarbons undergoing conversion through the catalyst in the presence of a promoter, maintaining said catalyst under isomerizing conditions and increasing the concentration of promoter in said stream as it advances through the catalyst, the concentration of promoter during initial contact being less than that during subsequent contact with the catalyst.

11. In the process of isomerizing hydrocarbons by contact with an isomerization catalyst in the presence of a promoter for the catalyst, the steps which comprise passing a stream of hydrocarbons undergoing conversion through a reaction zone comprising a plurality of stages, each of said stages containing said isomerization catalyst, maintaining each stage under isomerizing conditions and increasing the concentration of promoter in said stream of hydrocarbons as it advances through succeeding stages, the concentration of promoter in the initial stage being less than that in a succeeding stage.

CLAUDE W. WATSON.